US009527006B2

(12) United States Patent
Burton et al.

(10) Patent No.: US 9,527,006 B2
(45) Date of Patent: Dec. 27, 2016

(54) APPARATUS AND METHOD FOR LIQUID PURIFICATION

(71) Applicants: Sam J. Burton, Lee's Summit, MO (US); Dick Burton, Kingsville, MO (US)

(72) Inventors: Sam J. Burton, Lee's Summit, MO (US); Dick Burton, Kingsville, MO (US)

(73) Assignee: Perpetual Water, LLC, Kingsville, MI (US)

( * ) Notice: Subject to any disclaimer, the term of this patent is extended or adjusted under 35 U.S.C. 154(b) by 661 days.

(21) Appl. No.: 13/970,391

(22) Filed: Aug. 19, 2013

(65) Prior Publication Data

US 2015/0047967 A1 Feb. 19, 2015

(51) Int. Cl.
*B01D 3/10* (2006.01)
*B01D 1/16* (2006.01)
*B01D 1/20* (2006.01)
*B01D 5/00* (2006.01)

(52) U.S. Cl.
CPC . *B01D 3/10* (2013.01); *B01D 1/16* (2013.01); *B01D 1/20* (2013.01); *B01D 5/006* (2013.01)

(58) Field of Classification Search
CPC ............... B01D 1/16; B01D 1/20; B01D 3/10; B01D 5/006; B01D 5/0027; C02F 1/10; C02F 1/12
See application file for complete search history.

(56) References Cited

U.S. PATENT DOCUMENTS

| | | | | |
|---|---|---|---|---|
| 3,797,550 A | * | 3/1974 | Latinen | B01D 1/226 159/2.2 |
| 3,864,932 A | * | 2/1975 | Hsiao | B01D 1/0082 417/534 |
| 4,082,616 A | * | 4/1978 | Antony | B01D 1/16 202/173 |
| 4,309,243 A | * | 1/1982 | Sundquist | B01D 1/00 159/24.3 |
| 6,426,005 B1 | * | 7/2002 | Larsson | B01D 24/007 210/252 |
| 2001/0011631 A1 | * | 8/2001 | Lumbreras | B01D 1/16 203/10 |
| 2004/0144727 A1 | * | 7/2004 | McCoy | C02F 1/004 210/668 |
| 2010/0264013 A1 | | 10/2010 | Burton | |

* cited by examiner

*Primary Examiner* — Jill Warden
*Assistant Examiner* — Matthew Krcha
(74) *Attorney, Agent, or Firm* — Erickson Kernell IP, LLC

(57) ABSTRACT

Apparatus, methods, and systems for separating a fluid mixture are provided which employ gas-handling equipment operable to introduce a gas into the liquid mixture prior to being dispersed within the apparatus, vacuum conditions, and internal condensing. The liquid mixture is dispersed within the separation apparatus as micro-sized droplets. A more volatile portion of the liquid mixture is vaporized when exposed to the vacuum conditions and separates from the non-vaporized liquid portion. The vaporized portion is directed to a condensing structure within the apparatus, which condenses the vaporized portion into a liquid product.

13 Claims, 16 Drawing Sheets

APPARATUS AND METHOD FOR LIQUID PURIFICATION

BACKGROUND OF THE INVENTION

Field of the Invention

The apparatus, methods, and systems described herein are useful for separating fluid mixtures. In one embodiment, the apparatus, method, and system can be used to separate a fluid stream comprising a raw or untreated water source having a most volatile fraction, a less volatile fraction, and a least volatile fraction, the less volatile fraction being predominantly pure water. The separation is accomplished through the use of a separation apparatus operating at vacuum conditions and moderate temperatures.

Description of the Prior Art

Access to sources of potable water is a concern particularly in areas not served by municipal water-treatment plants. In such areas, stream, lake or even ground water can become contaminated with agricultural and industrial pollutants such as pesticides, herbicides, fertilizers, fracking fluids and other volatile organic compounds. Fresh water can also be a scarce resource in locales adjacent saltwater bodies. Contaminants, including brine from seawater, must be separated before the water can be rendered suitable for animal or human consumption. Even if rendering water potable is not a concern, various industrial applications require water that is free from minerals or corrosive contaminants that might lead to equipment fouling. Thus, separation of liquid mixtures, particularly when water is a predominant component of the mixture, is an important concern.

Liquid mixture separators and systems often require large, immobile pieces of equipment, such as distillation columns and decanters. In separators that vaporize a portion of the liquid mixture, an external condenser is required to condense the vapor to recover the desired liquid product. Providing the necessary cooling for the external condenser often requires additional costly energy input. Further, to achieve the desired separation, distillation columns must be designed to include many separation trays, raising initial capital costs. Such large and energy intensive equipment is impractical for use when mobility is required or in remote locations, for example, when water purification is needed in response to a natural disaster.

SUMMARY OF THE INVENTION

In one embodiment of the present invention there is provided an apparatus for separating a mixture of at least two materials having different volatilities. The apparatus comprises a tubular outer housing defining a vacuum chamber located within the housing, a fluid-collection trough defining a vaporization zone, one or more spray nozzles located within the vaporization zone, and a condensing structure located within the housing and operable to introduce a condensing fluid into the vacuum chamber. A liquid mixture supply conduit feeds the liquid mixture into the vacuum chamber and disperses the liquid into the vaporization zone through the spray nozzles as finely dispersed droplets. At least a portion of the liquid mixture is vaporized upon exposure to the vacuum conditions and exits the vaporization zone through a vapor passage. Optionally, a mesh material may be disposed within the vapor passage to prevent any non-vaporized portion of the mixture from escaping the vaporization zone. Upon exiting the vaporization zone, the vapor portion contacts the condensing fluid, condensing at least a portion of the vapor product to form a liquid product. Any non-vaporized portion of the liquid mixture introduced into the vaporization zone is collected by the fluid-collection trough and discharged from the housing.

In another embodiment of the present invention there is provided an apparatus for separating a mixture of at least two liquids having different volatilities. The apparatus comprises a tubular outer housing defining a vacuum chamber located within the housing, a fluid-collection trough defining a vaporization zone and including a hollow structure constructed to allow one or more temperature control conduits to pass through, one or more spray nozzles located within the vaporization zone, and a condensing structure located within the housing. A liquid mixture supply conduit feeds the liquid mixture into the vacuum chamber and disperses the liquid into the vaporization zone through the spray nozzles as finely dispersed droplets. At least a portion of the liquid mixture is vaporized upon exposure to the vacuum conditions and exits the vaporization zone through a vapor passage. Optionally, a mesh material may be disposed within the vapor passage to prevent any non-vaporized portion of the mixture from escaping the vaporization zone. Temperature control conduits may be disposed within the vapor passage to maintain a constant contact temperature on the surface of the mesh material. Upon exiting the vaporization zone, the vapor portion contacts the condensing structure, condensing at least a portion of the vapor product to form a liquid product. Any non-vaporized portion of the liquid mixture introduced into the vaporization zone is collected by the fluid-collection trough and discharged from the housing.

In still another embodiment of the present invention there is provided a system for separating a liquid mixture comprising a most volatile fraction, a less volatile fraction, and a least volatile fraction, wherein the less volatile fraction comprises the predominant component of the liquid mixture. The system comprises a first upstream separation apparatus and a second downstream separation apparatus, with a first and second gas-handling apparatus operable to introduce a gas component into the liquid mixtures before feeding them into the respective separation apparatuses. The first separation apparatus comprises a tubular outer housing defining a vacuum chamber, a fluid-collection trough defining a vaporization zone and a vapor passage, and one or more spray nozzles for introducing the liquid mixture into the vaporization zone as finely dispersed droplets. The first separation apparatus is operable to separate the most volatile fraction from the liquid mixture. The second separation apparatus comprises a tubular outer housing defining a vacuum chamber, a fluid-collection trough defining a vaporization zone and a vapor passage, one or more spray nozzles for introducing the liquid mixture into the vaporization zone as finely dispersed droplets, and a condensing structure disposed to contact and condense at least a portion of the vaporized mixture to form a liquid product. The liquid product may comprise a substantially pure amount of the less volatile fraction.

In yet another embodiment of the present invention there is provided a method for separating a mixture of at least two materials having different volatilities. The method comprises introducing a gas into a feed stream of the liquid mixture, so as to cause at least a portion of the gas to become dissolved within the mixture, and subsequently directing the gas-containing mixture into a separation apparatus operating under vacuum conditions. Within the separation apparatus, the mixture is transported along at least a portion of the length of a vaporization zone defined by a fluid-collection trough disposed within the housing. The mixture is dispersed within the vaporization zone as a plurality of finely dispersed droplets causing the more volatile components of the mixture to vaporize. The vaporized portion is condensed within the housing and collected as liquid product. The non-vaporized portion is delivered to a waste stream within the trough and removed from the housing.

DETAILED DESCRIPTION OF THE PREFERRED EMBODIMENT

Apparatus, methods, and systems according to the present invention are directed toward separating a liquid product from a liquid mixture. The apparatus is particularly useful in separating a more volatile fraction from a less volatile fraction in a liquid mixture to recover a substantially pure liquid product that is essentially free of the components less volatile fraction. In certain embodiments, the apparatus may be constructed to be portable so as to allow separation of any raw liquid feed in a variety of locations. For example, the apparatus may be placed on or within a trailer that can be transported between locations via a semi-tractor. In another embodiment, the systems are particularly useful in separating a more volatile fraction, a less volatile fraction, and a least volatile fraction in a liquid mixture to recover a liquid product comprising substantially pure less volatile component.

Figure 1:
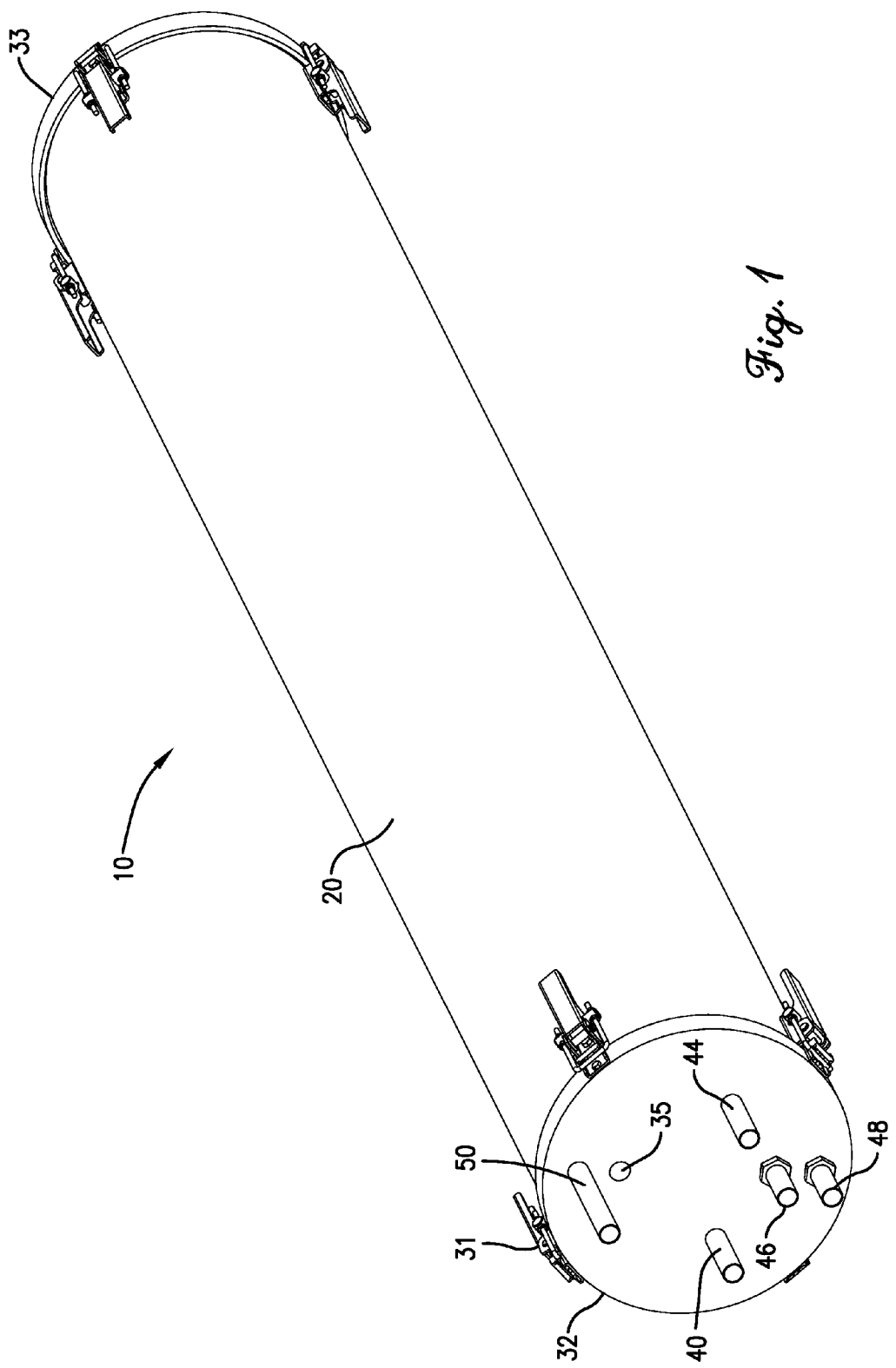
FIG. 1 is a perspective view of a liquid separation apparatus according to one embodiment of the present invention.

Turning to the drawings, and FIG. 1 in particular, a separation apparatus 10 according to one embodiment of the present invention is shown. Separation apparatus 10 comprises a tubular outer housing 20. End caps 32 and 33 are secured to outer housing 20 by one or more draw latches 31; however, any type of fastener known to those of skill in the art may be used to secure caps 32, 33 to housing 20. A liquid mixture feed line 40 enters outer housing 20 through cap 32 and exits housing 20 through cap 32 by way of outlet 44. A liquid product outlet 48 and liquid discharge outlet 46 are secured to, and extend outwardly from cap 32. In certain embodiments of the present invention, condenser fluid inlet 50 enters housing 20 through cap 32. Cap 32 also includes a vacuum port 35, which allows a mechanical vacuum device (not shown) to be attached and maintain substantially vacuum conditions within the spaced defined by outer housing 20. In certain embodiments of the present invention, the tubular housing 20 has a substantially horizontal longitudinal central axis, but it is within the scope of the present invention for housing 20 to be slightly inclined to assist with gravity draining of various product streams. In certain embodiments, this incline is less than 10°, less than 5°, or less than 2° relative to the horizontal.

Figure 2:
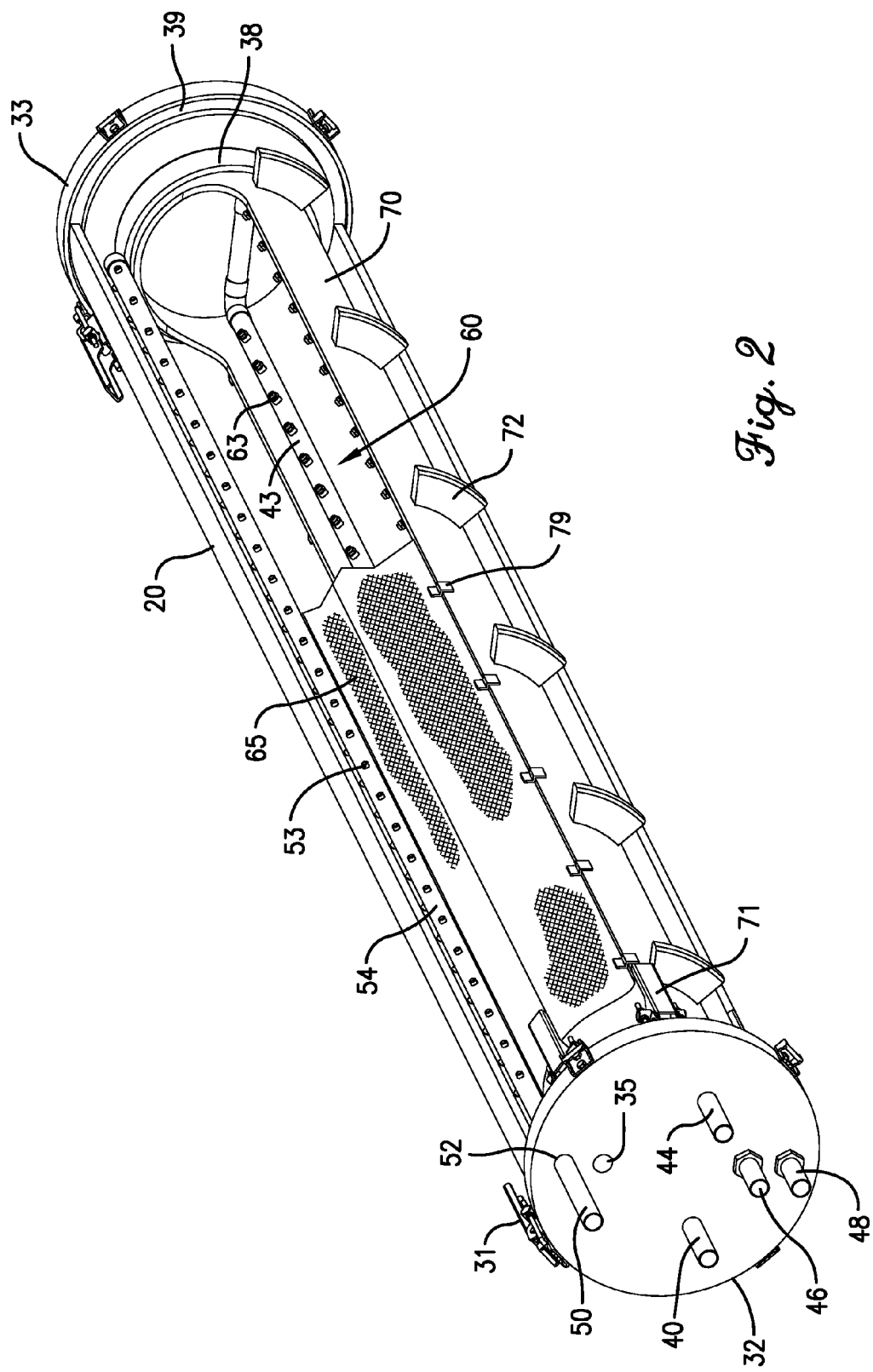
FIG. 2 is a perspective view of the apparatus in FIG. 1 with sections removed to expose the inner components of the apparatus.
Figure 3:
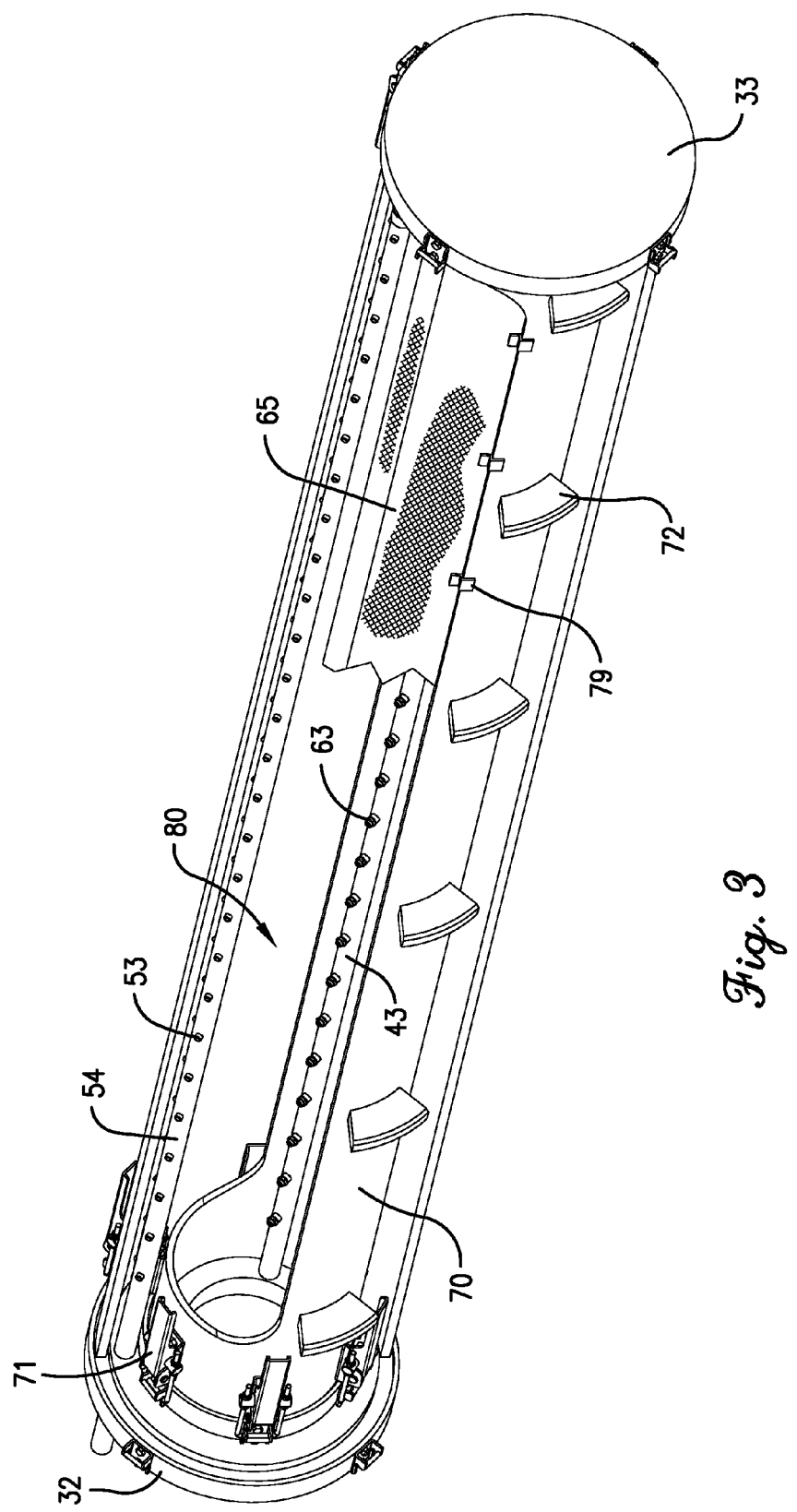
FIG. 3 is a perspective view of the apparatus in FIG. 1 from a different angle and with different sections removed than FIG. 2.
Figure 4:
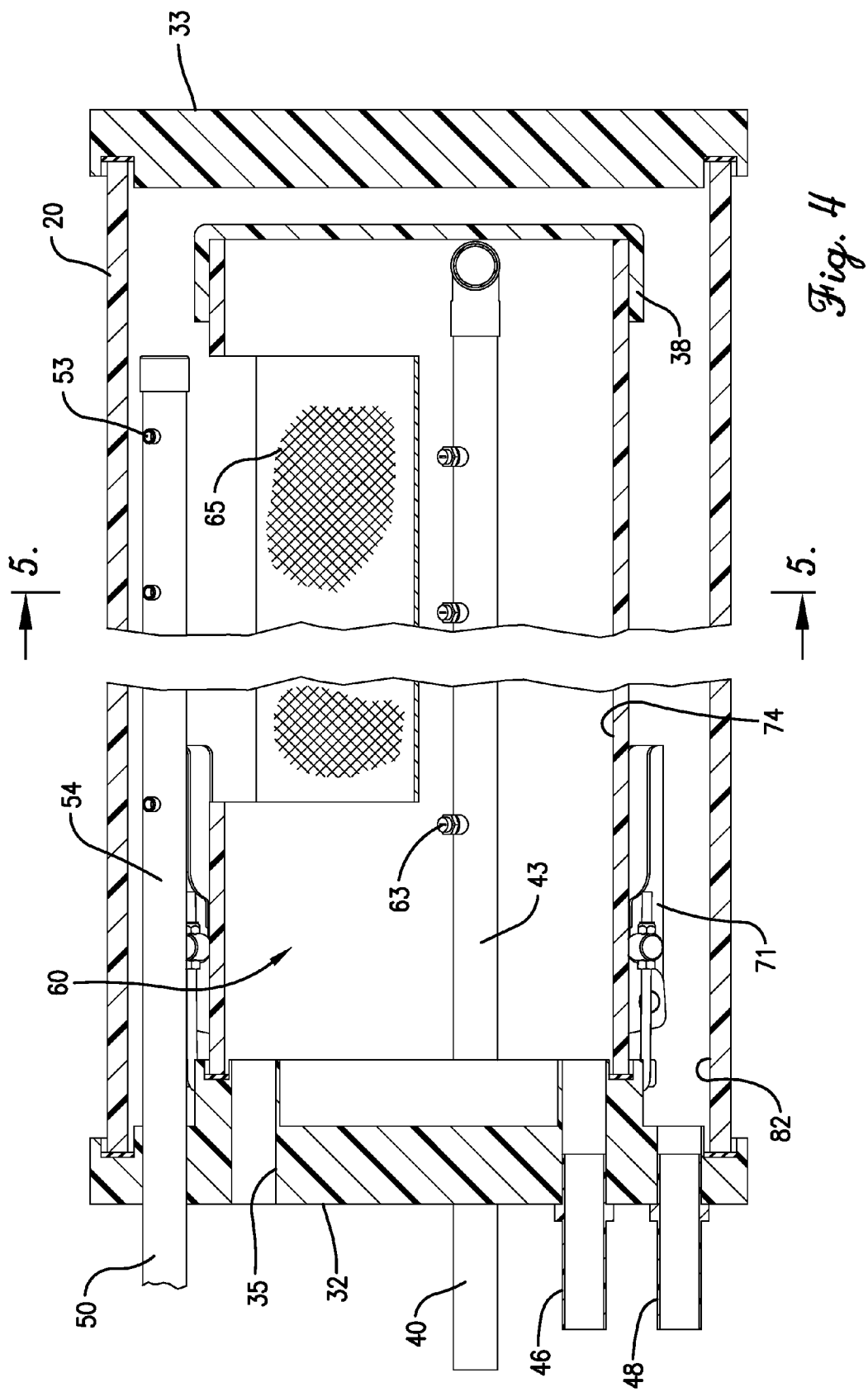
FIG. 4 is a broken cross-sectional view of the apparatus in FIG. 1 exposing the components along the longitudinal central axis of the apparatus.

As can be seen in FIG. 3, the boundaries of outer housing 20 define a vacuum chamber 80 within the housing 20. The components of separator 20 residing within vacuum chamber 80 are further illustrated in FIG. 2. Feed line 40 is directed along the length of housing 20 into a vaporization zone 60 through one or more liquid mixture supply conduits 43. Supply conduit 43 is equipped with one or more nozzles 63 for introducing the liquid mixture into a vaporization zone 60. Supply conduit 43 continues substantially along the length of housing 20 toward end cap 33. Conduit 43 then makes a U-turn and directs the liquid mixture carried thereby back along the length of housing 20, exiting housing 20 through feed outlet 44. In certain embodiments, nozzles 63 are spray nozzles operable to introduce the liquid mixture into vaporization zone 60 as a finely dispersed mist comprising micro-sized droplets. Any amount of the liquid mixture that is not introduced into vaporization zone 60 via nozzles 63 is directed by conduit 43 out of housing 20 through liquid mixture outlet 44. This portion of the liquid mixture may be returned to its source (e.g., a holding tank or natural body of water), or directed toward another apparatus 10 connected in series.

Vacuum chamber 80 further comprises a fluid-collection trough 70. In certain embodiments of the present invention, the longitudinal horizontal axis of fluid collection trough 70 runs substantially parallel to the longitudinal horizontal axis of outer housing 20, or even may be coaxial therewith. One or more trough supports 72 are attached to the outer wall of the fluid-collection trough 70 and are disposed to maintain a certain spatial relationship between the trough 70 and outer housing 20. In certain other embodiments, a mesh material 65 is disposed above trough 70 and supply conduit 63 in a vapor passage 64, more clearly shown in FIG. 5. Mesh material 65 preferably comprises a screen made from a metal or synthetic resin material. In preferred embodiments, mesh material 65 is non-corrosive so that contact with the fluids being handled by apparatus 10 (namely, aqueous fluids) does not corrode or degrade the material. Mesh material 65 is secured into place above the trough 70 by mesh attachments 79. FIG. 3 shows another view of the contents of vacuum chamber 80, including internal draw latches 71 for securing fluid collection trough 70 to front end cap 32. Again, any type of fastening device may be substituted for latches 71.

Figure 6:
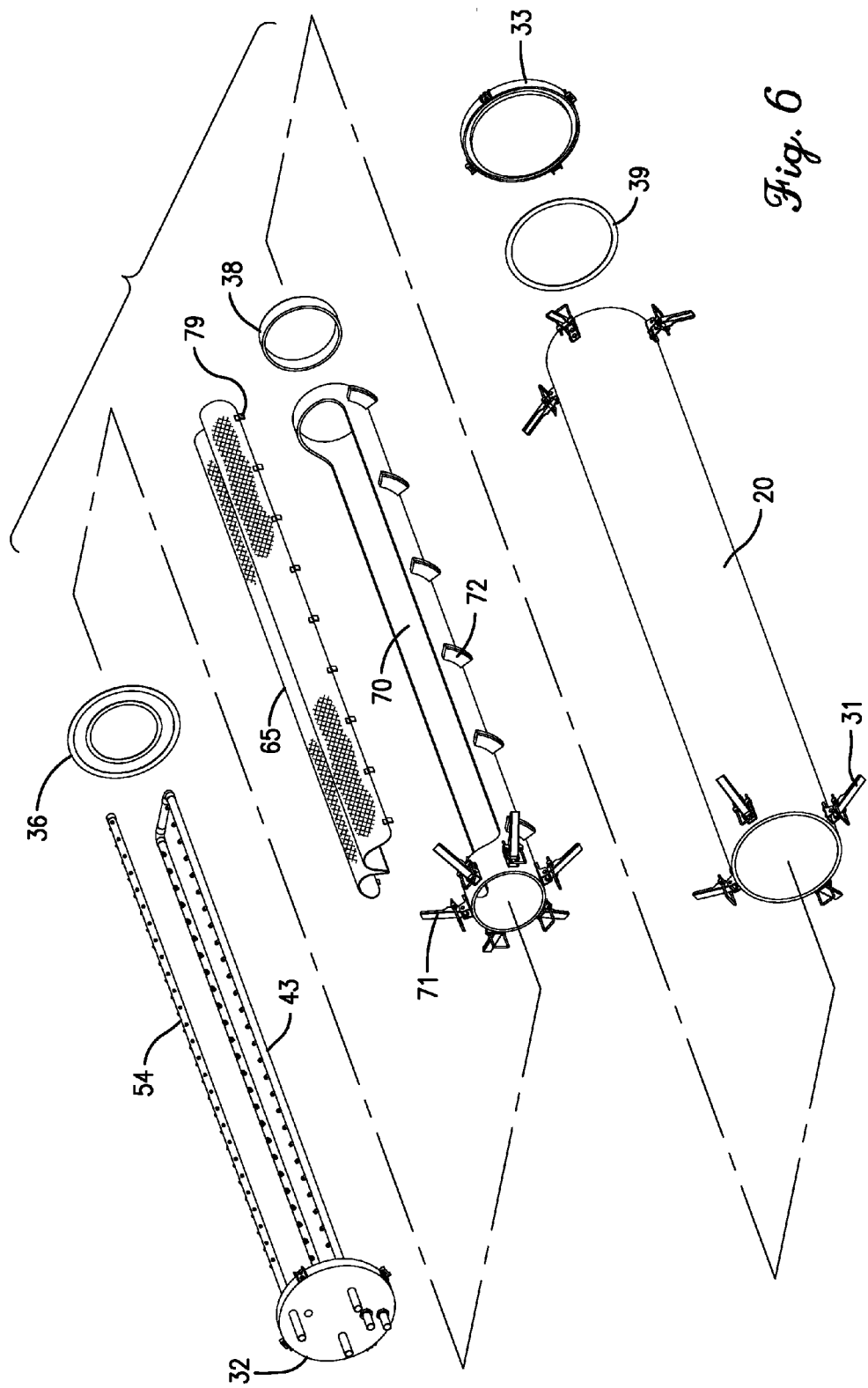
FIG. 6 is an exploded view of the apparatus in FIG. 1.
Figure 7:
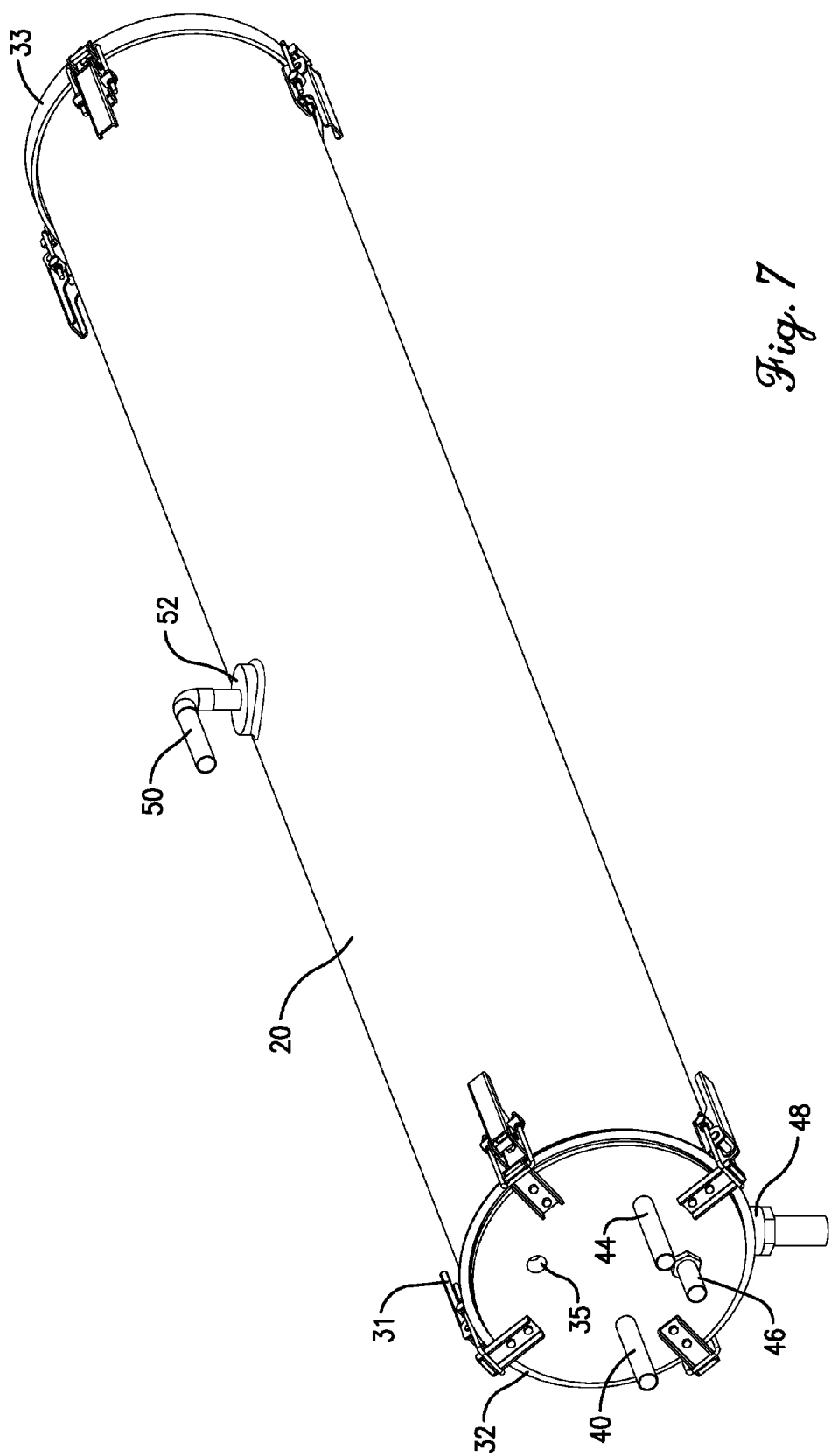
FIG. 7 is a perspective view of a liquid separation apparatus according to an alternate embodiment of the present invention.
Figure 8:
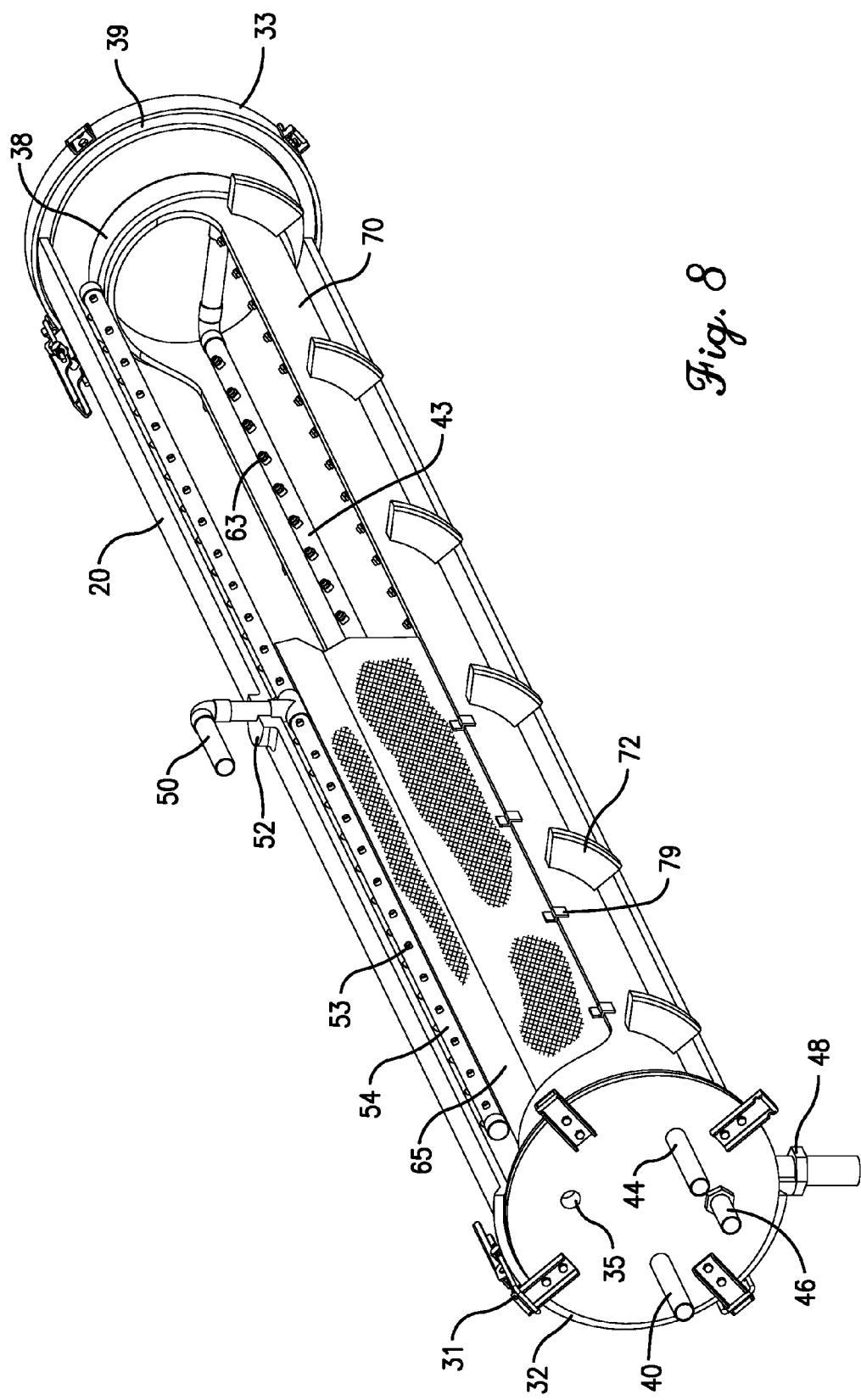
FIG. 8 is a perspective view of the apparatus in FIG. 7 with sections removed to expose the inner components of the apparatus.
Figure 9:
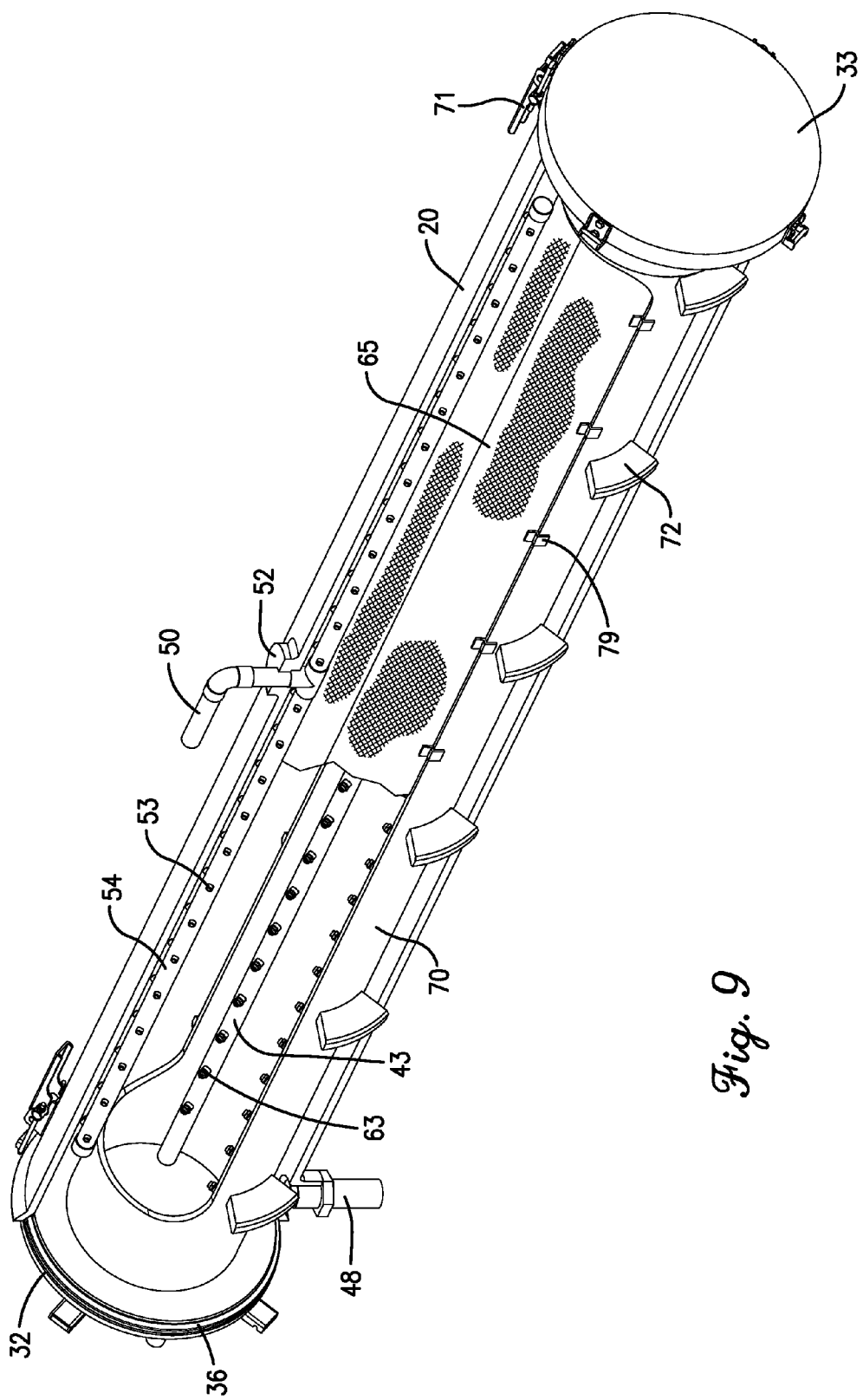
FIG. 9 is a perspective view of the apparatus in FIG. 7 from a different angle and with different sections removed than FIG. 8.
Figure 10:
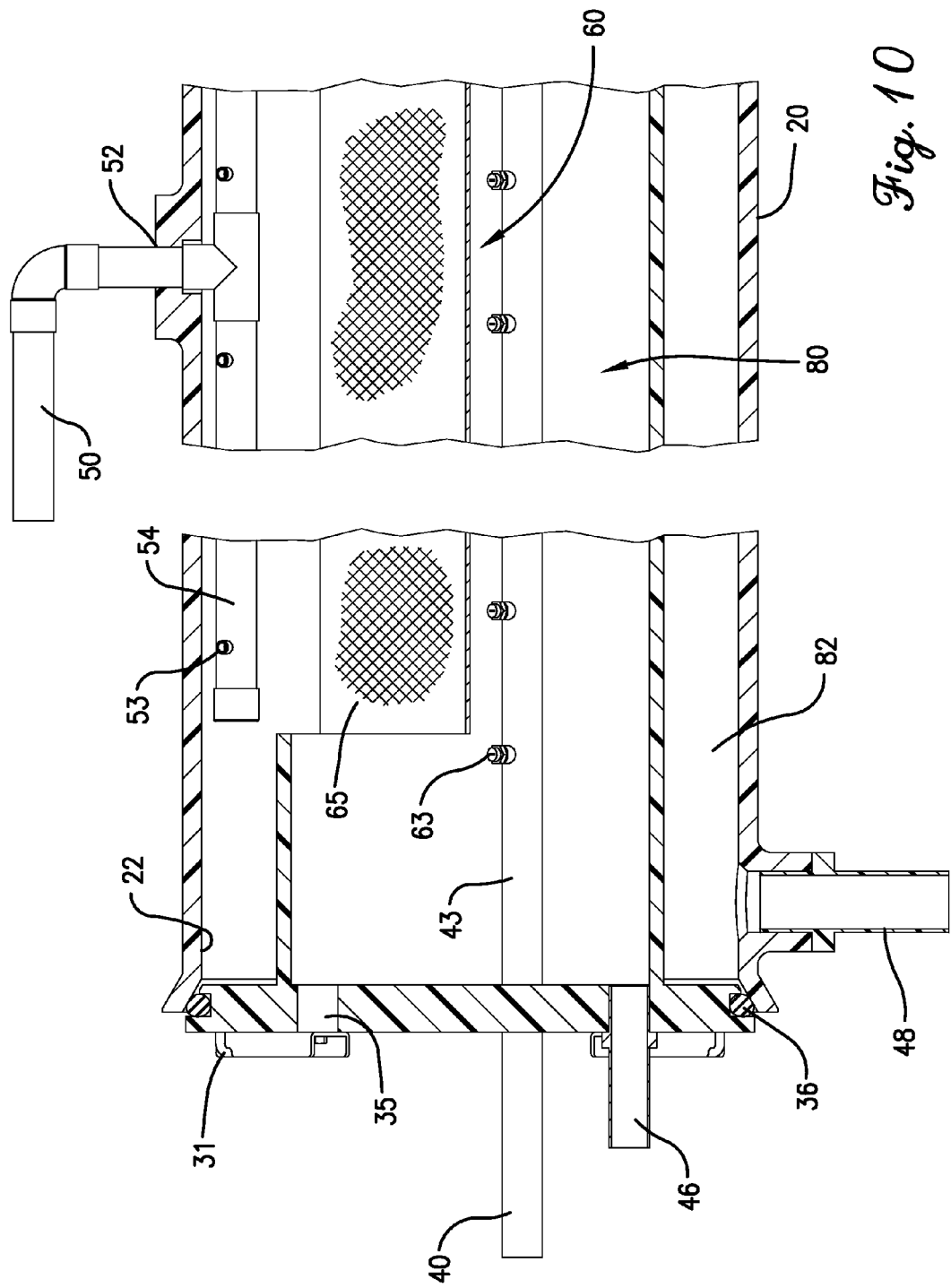
FIG. 10 is a partial broken cross-sectional view of the apparatus in FIG. 7 exposing the components along the longitudinal central axis of the apparatus.
Figure 11:
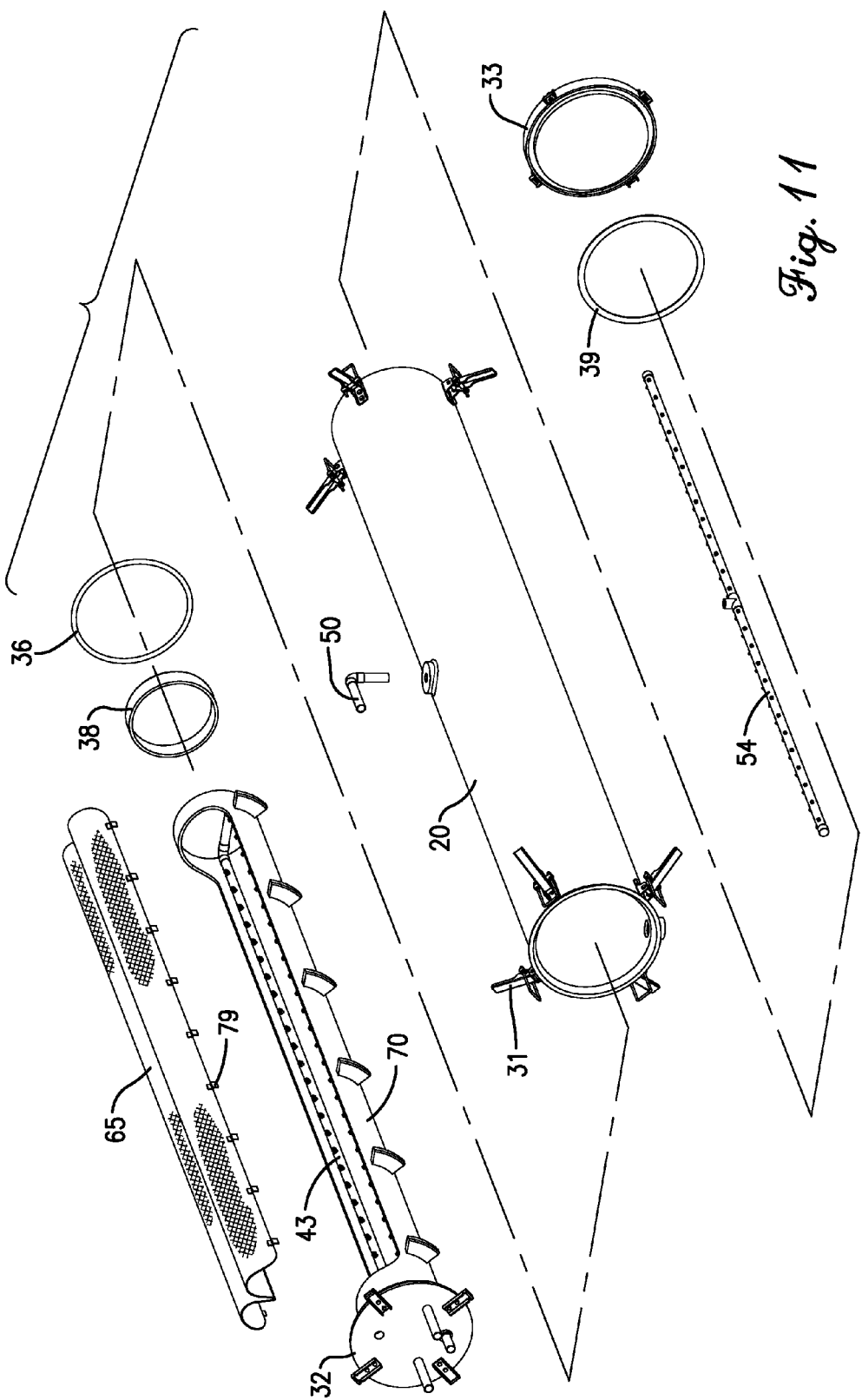
FIG. 11 is an exploded view of the apparatus in FIG. 7.
Figure 12:
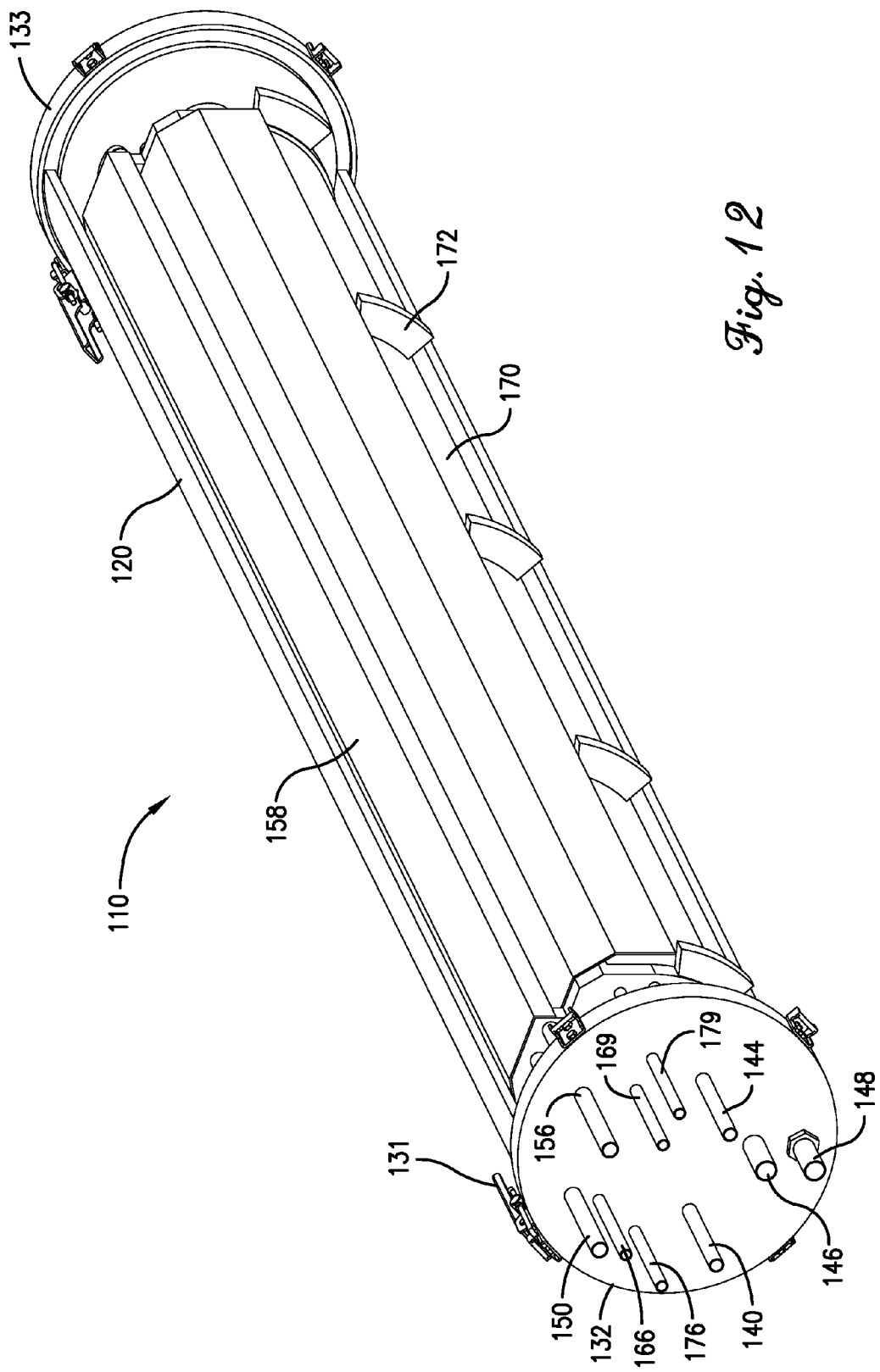
FIG. 12 is a perspective view of a liquid separation apparatus according to another embodiment of the present invention with sections removed to expose the inner components of the apparatus.
Figure 13:
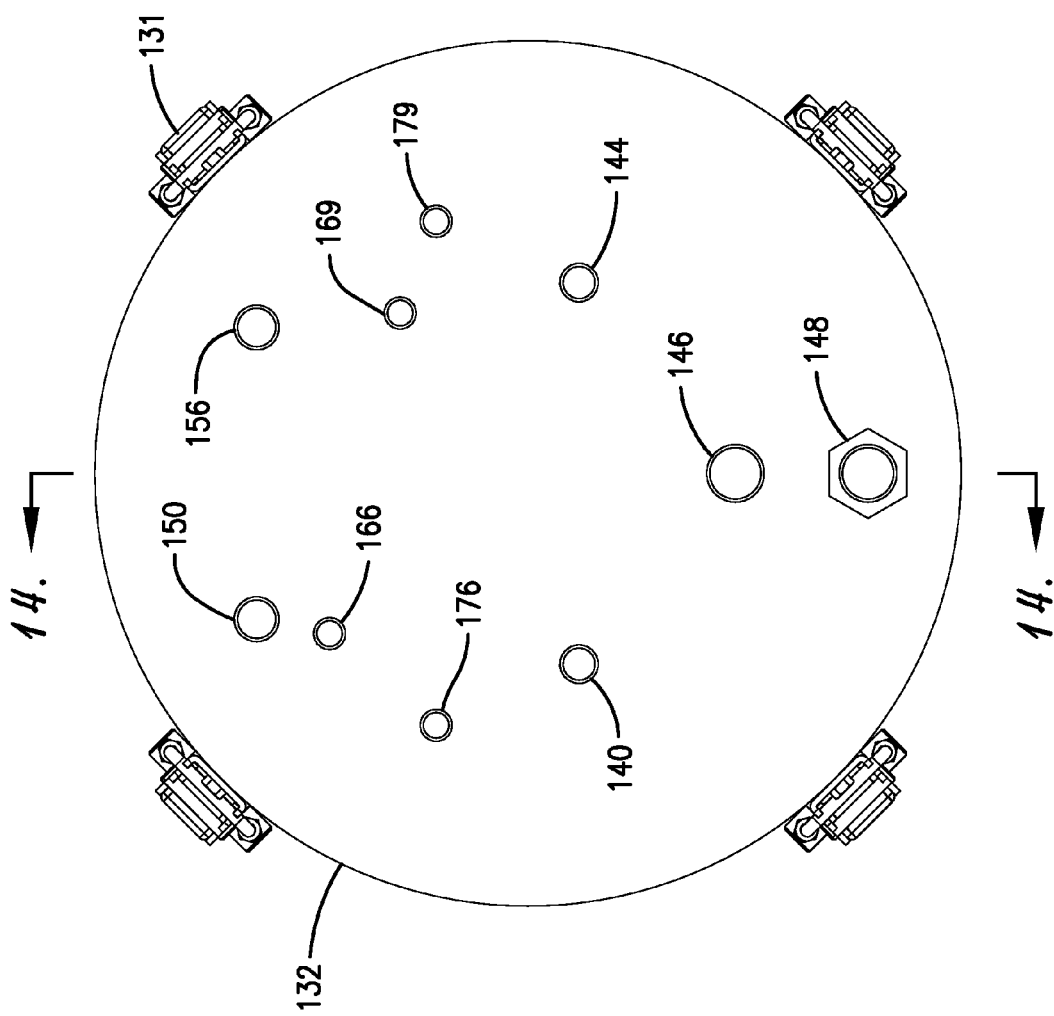
FIG. 13 is an end elevation view of the apparatus in FIG. 12, in particular illustrating an end cap through which a number of lines communicating with the interior of the apparatus are located.

Apparatus 10 further comprises a condenser fluid supply conduit 54 extending into vacuum chamber 80 and directed along the length of housing 20 in disposition above fluid collection trough 70. In certain embodiments, condenser fluid supply conduit 54 directs condensing fluid supplied via inlet 50 into vacuum chamber 80 through end cap 32 along the length of housing 20 toward end cap 33. In certain other embodiments, such as the embodiment shown in FIGS. 7-11, condenser fluid feed 50 enters housing 20 through condenser inlet 52 disposed in the wall of housing 20. Regardless of the entry point, condenser fluid supply conduit 54 directs condenser fluid feed 50 along the length of housing 20 toward either the front end cap 32, back end cap 33, or both. Conduit 54 may comprise one or more condenser fluid outlets 53 operable to introduce a condensing fluid into the vacuum chamber 80. In the embodiment of FIGS. 7-11, liquid product outlet 48 is disposed within housing 20, rather than end cap 32. FIG. 6 is an exploded view of apparatus 10 illustrating assembly of the various components thereof. As can be seen, apparatus 10 further comprises a gasket 36 configured to seal between end cap 32 and trough 70, a trough end cap 38 configured to seal the end of trough 70 adjacent end cap 33, and an O-ring 39 operable to provide a seal between housing 20 and end cap 33.

Figure 16:
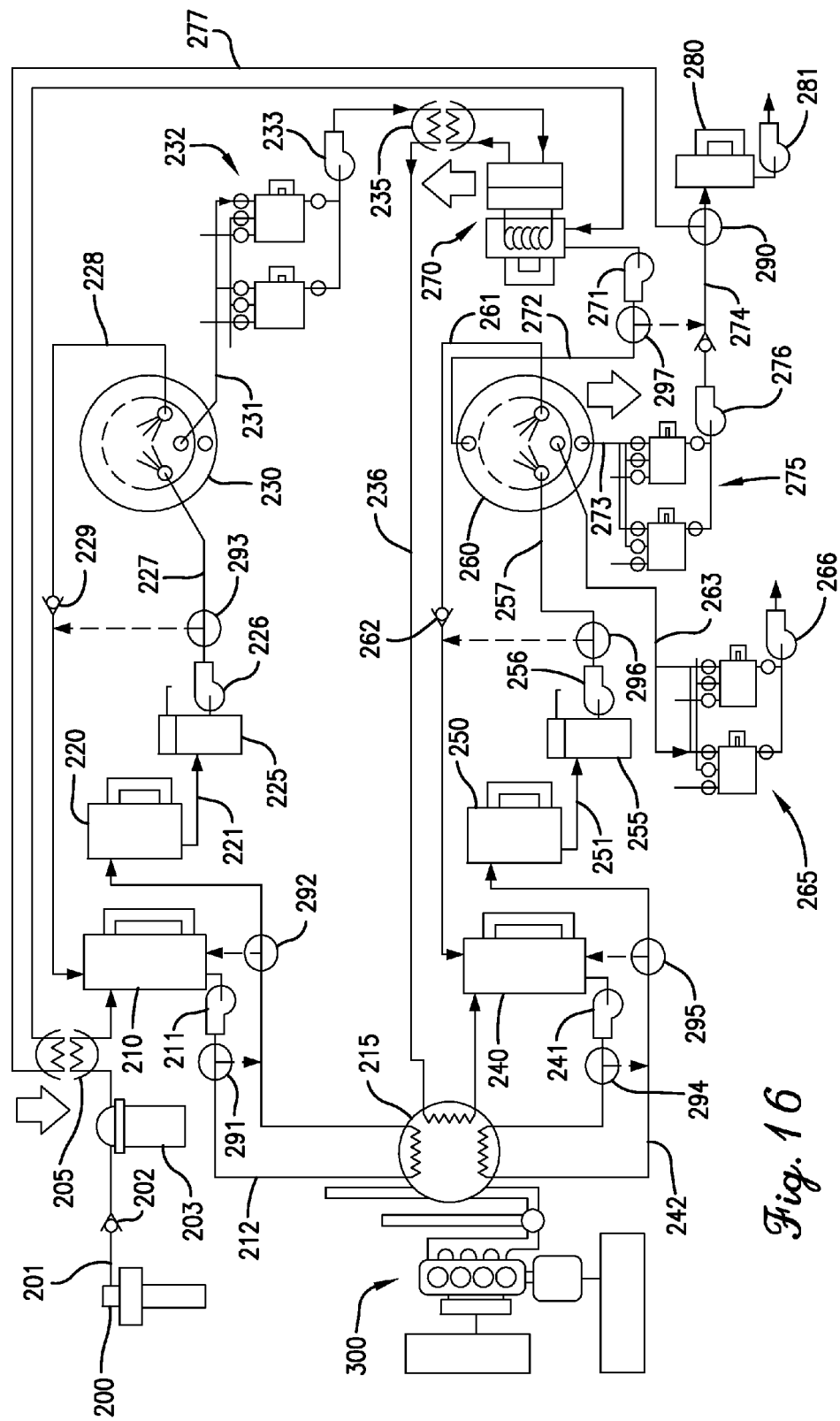
FIG. 16 is a schematic diagram of a fluid separation system made in accordance with an embodiment of the present invention.

In the above-described embodiments of the present invention illustrated by FIGS. 1-11, a liquid mixture is fed to separation apparatus 10 by liquid mixture feed line 40. The liquid mixture may have previously undergone some kind of pre-treatment operation, such as will be described in greater detail below with reference to FIG. 16. In certain embodiments, this pre-treatment may include the filtering or removal of undissolved solids. In certain embodiments, the liquid mixture may also include dissolved gasses that are deliberately introduced into the liquid mixture in order to assist with product separation. In other embodiments, the liquid mixture may contain dissolved solids, such as metal ions (e.g., from brine) and surfactants. In one particular embodiment, the liquid mixture may be a fluid used in downhole fracking operations. While generally fracking fluid comprises predominantly water and sand, the fracking fluid may also contain any number of additives such as ethylene glycol, borate salts, sodium and potassium carbonate, guar gum, and isopropanol that must be removed before the fluid can be discharged into the environment. In other embodiments, the liquid mixture may comprise high-salinity seawater, or fresh water that may be contaminated with various microbes and disease-causing pathogens.

The liquid mixture is supplied to apparatus 10 by feed line 40. The mixture is then carried by liquid mixture supply conduit 43 along at least a portion of the length of housing 20 within the vaporization zone 60 defined at least in part by fluid-collection trough 70. The liquid mixture carried by conduit 43 is dispersed into vaporization zone 60 as a plurality of fine, micro-sized droplets via nozzles 63. Nozzles 63 may be configured to disperse the liquid mixture as droplets having average droplet sizes of between about 20 to about 60 microns, between about 30 to about 50 microns, or about 40 microns. It should be appreciated that the term "nozzle" may include any structure or orifice operable to introduce the liquid mixture into the vaporization zone 60.

Upon spraying into vaporization zone 60, the dissolved gasses within the droplets are rapidly liberated thereby causing the micro-sized droplets to burst into a plurality of even smaller droplets (i.e., submicron-sized) having a greatly reduced surface tension, which results in a reduced liquid vapor pressure. This physical characteristic is described in more detail in U.S. Patent Application Publication No. 2010/0264013, incorporated by reference herein in its entirety.

Within vaporization zone 60, the droplets are exposed to vacuum conditions, which cause at least a portion of the more volatile fraction to vaporize and separate from the liquid mixture. The vaporized portion of the mixture passes through vapor passage 64 (see, e.g., FIG. 5) outwardly toward the inner wall 22 of outer housing 20. After exiting vaporization zone 60 through vapor passage 64, the vaporized portion may be either discharged as a waste stream through vacuum port 35 (especially if apparatus 10 is to be used to separate VOCs from the fluid mixture as described further below) or other discharge outlet, or the vapor may be condensed and recovered as a condensed liquid product. Any liquid mixture remaining in feed line 40 and not introduced into vaporization zone 60 continues through conduit 43 and is directed out of separation apparatus 10 through feed outlet 44.

Figure 5:
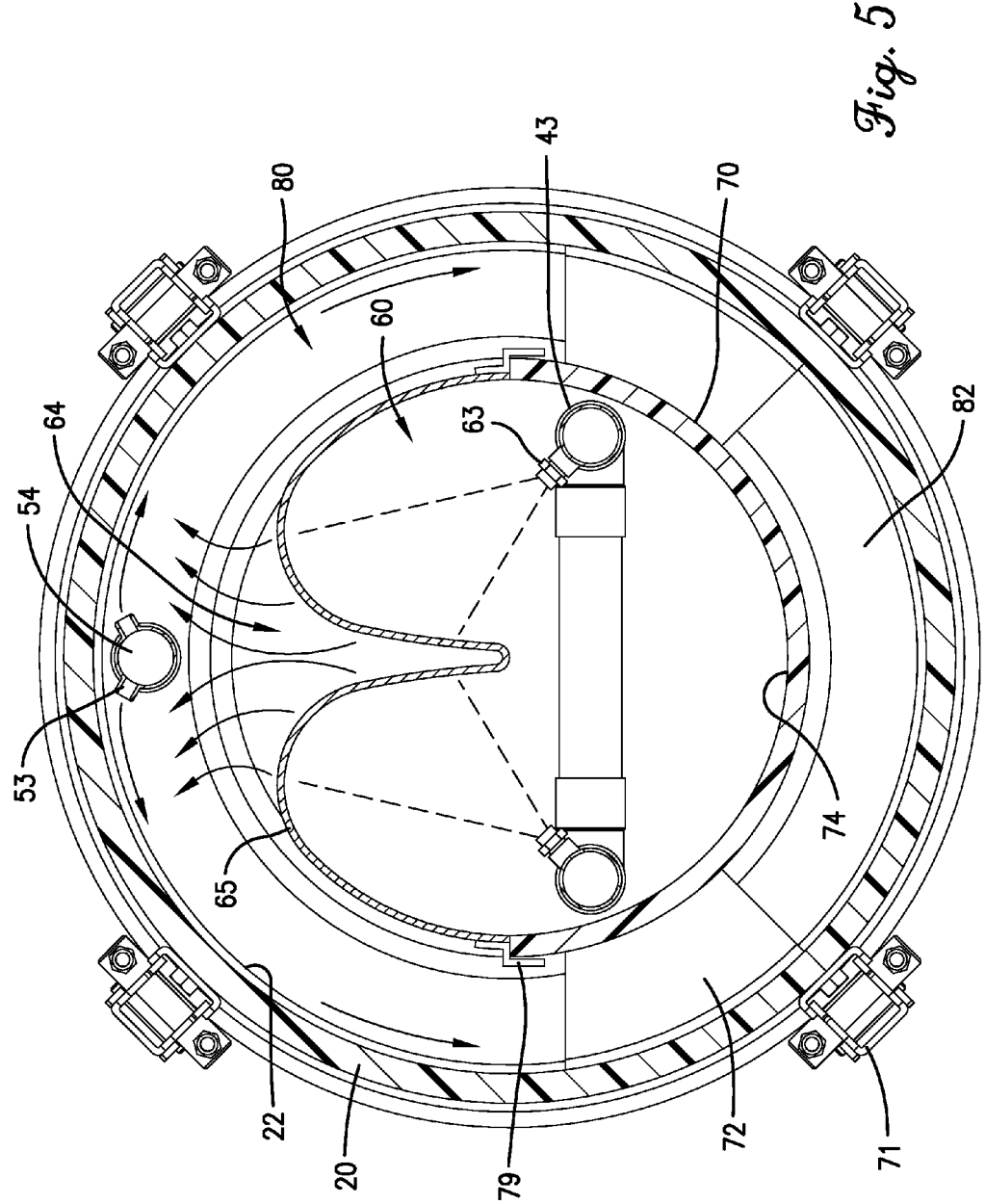
FIG. 5 is a view of the apparatus of FIG. 4 taken along line 5-5.

The non-vaporized portion of the liquid mixture introduced into vaporization zone 60 via nozzles 63 does not pass through vapor passage 64. In certain embodiments, mesh material 65 operates to catch and coalesce liquid droplets comprising the least volatile fraction of the liquid mixture that may have otherwise passed through vapor passage 64. Mesh material 65 may be substantially M-shaped in cross section, as shown in FIG. 5, or any other shape that effectively prevents the liquid portion from passing through vapor passage 64 while allowing the vapor portion through. In certain embodiments, mesh material 65 can isolate each individual nozzle 63 such that the spray pattern from one nozzle does not overlap or impinge upon the spray pattern of another, adjacent nozzle. The non-vaporized liquid portion comprising the least volatile fraction is collected in a channel 74 of fluid-collection trough 70 and directed out of the apparatus 10 through liquid discharge outlet 46 for further treatment or disposal.

In certain embodiments of the present invention, condenser fluid conduit 54 directs a condensing fluid from condenser feed 50 along at least a portion of the length of housing 20. The condensing fluid, which is preferably a recycle of the product fluid separated from the liquid mixture, is introduced into vacuum chamber 80 through one or more condenser fluid outlets 53 along the inner wall of outer housing 20. Condenser fluid outlets 53 are disposed such that the vapor portion leaving vaporization zone 60 through vapor passage 64 comes into contact with the condensing fluid. When the vapor portion contacts the condensing fluid, at least a portion of the vapor is condensed and mixes with the condensing fluid to form a condensed liquid product. In certain embodiments, the condensing fluid and condensed liquid product flows radially in laminar flow along the inner wall 22 toward a condensed liquid collection zone 82 located in the space between fluid-collection trough 70 and outer housing 20. The condensed liquid mixture flowing into the fluid collection zone 82 is then directed out of the vacuum chamber 80 of separation apparatus 10 through liquid product outlet 48.

FIGS. 12-15 illustrate another embodiment of the present invention that shares some similarities with the embodiments of FIGS. 1-11 described above. Turning first to FIGS.

12 and 13, a fluid separation apparatus 110 is shown comprising end caps 132 and 133 secured to a housing 120 by one or more draw latches 131. The liquid mixture feed line 140 enters outer housing 120 through cap 132 and exits out of housing 120 through cap 132 by way of outlet 144. A liquid product outlet 148 and a liquid discharge outlet 146 also extend outwardly from cap 132. In certain embodiments of the present invention, a condenser fluid feed enters housing 120 through condenser inlet 150 and exits housing 120 through condenser outlet 156. A temperature control fluid, whose function is explained in greater detail below, enters housing 120 through inlet 166 and exits through outlet 169. A feed line for supplying a temperature control fluid to a jacketed trough 170 enters housing 120 through jacket inlet 176 and exits housing 120 through jacket outlet 179. A vacuum port (not shown) may be included in cap 132, just as with the embodiments described previously, or in the wall of housing 120, which allows a mechanical vacuum device (not shown) to be attached and maintain substantially vacuum conditions within the outer housing 120.

Figure 14:
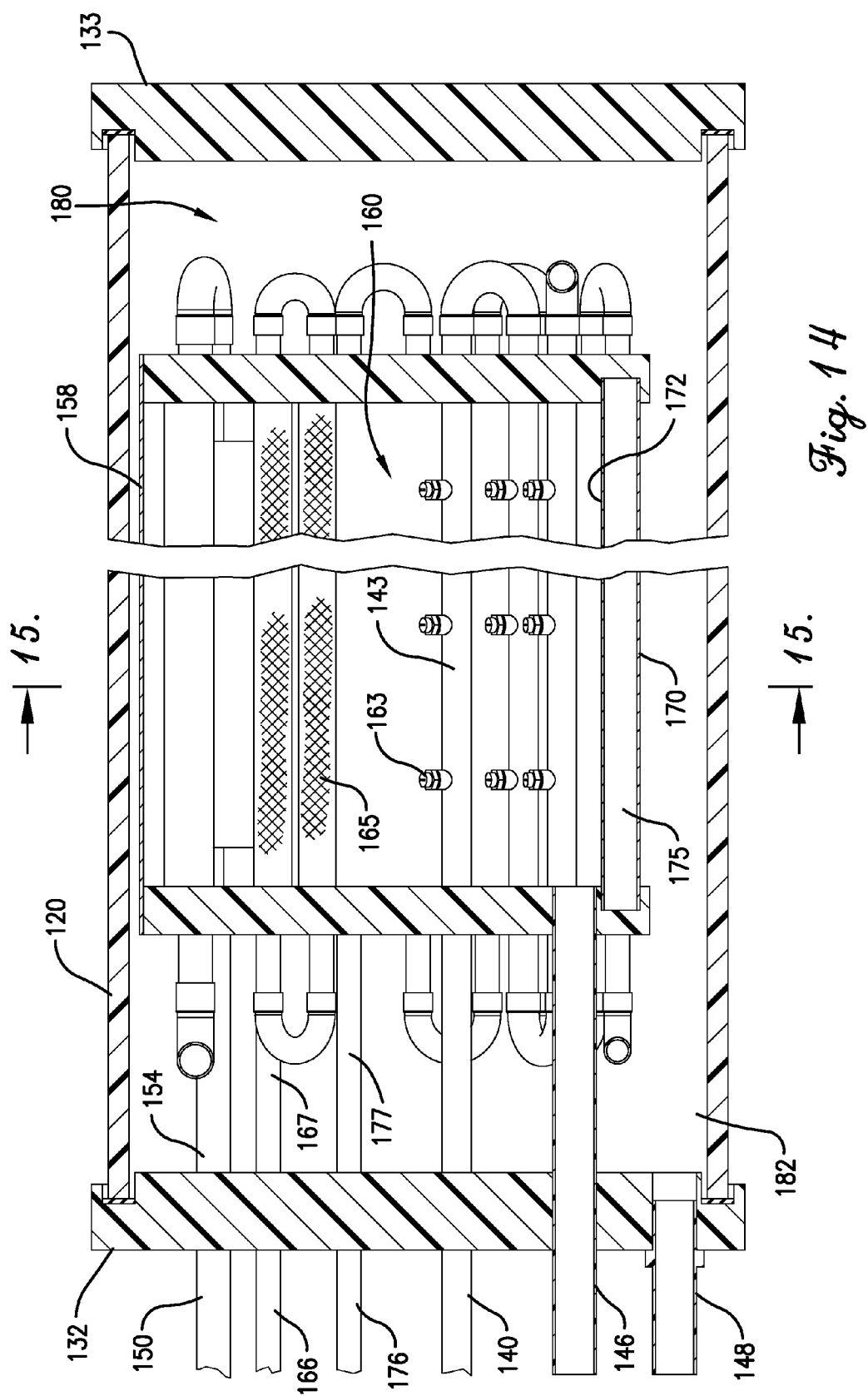
FIG. 14 is a broken, cross-sectional view of the apparatus of FIG. 13 taken along line 14-14 to expose the inner components of the apparatus.
Figure 15:
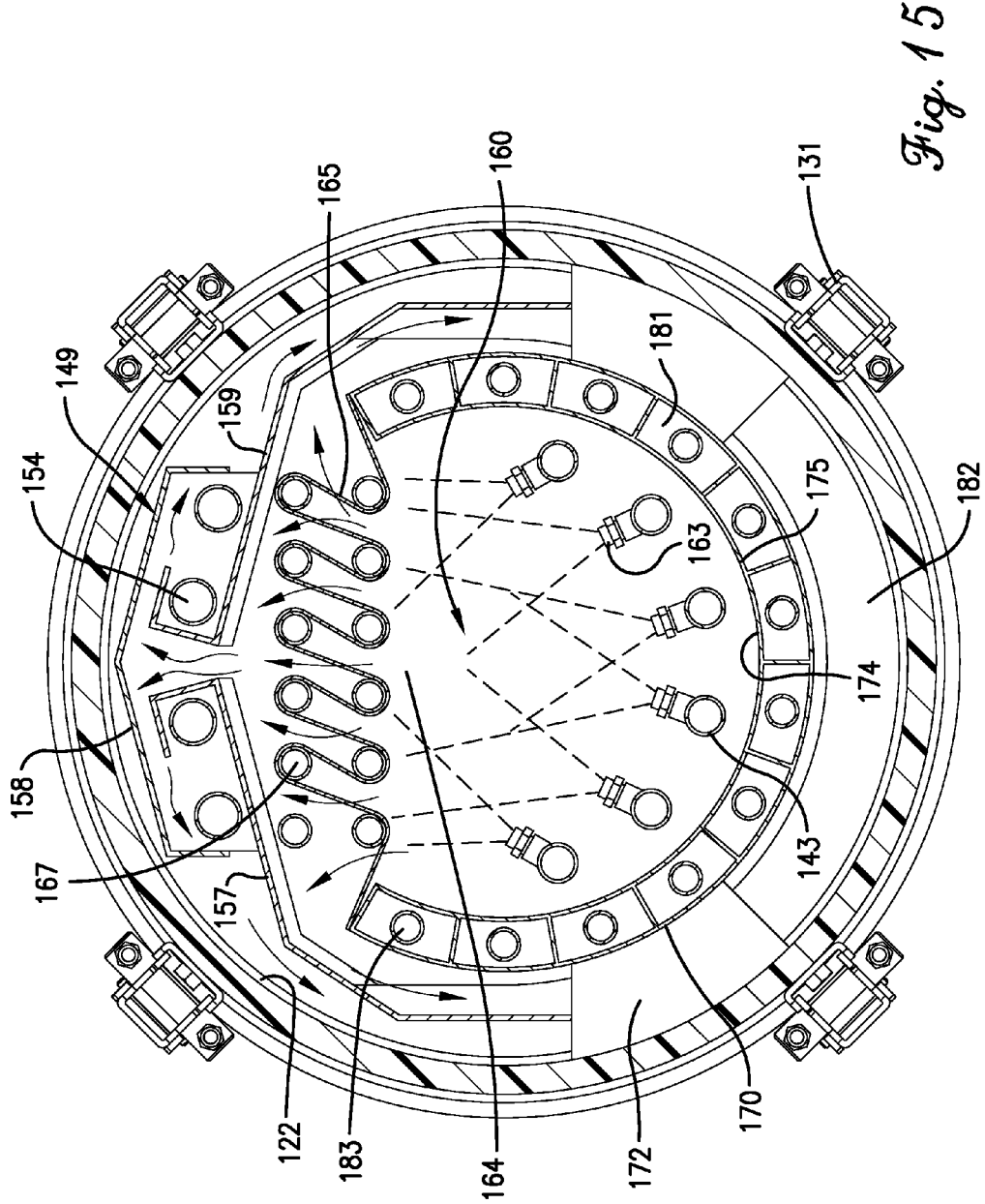
FIG. 15 is a view of the apparatus of FIG. 14 taken along line 15-15 to expose the inner components of the apparatus.

Outer housing 120 and end caps 132, 133 cooperate to define a vacuum chamber 180 within housing 120. FIGS. 14 and 15 best illustrate the various components of separation apparatus 110 located within vacuum chamber 180. The liquid mixture supplied by feed line 140 is directed into a vaporization zone 160 via supply conduit 143. Supply conduit 143 is equipped with one or more nozzles 163 for dispersing the liquid mixture within vaporization zone 160. Liquid mixture supply conduit 143 continues substantially along the length of housing 120 toward end cap 133. Before the conduit 143 reaches end cap 133, it makes a U-shaped turn (i.e., 180°) and is directed back along the length of housing 120 toward end cap 132. Before reaching end cap 132, conduit 143 makes another U-shaped turn and is directed back along the length of housing 120 toward back end cap 133. This back-and-forth turning of conduit 143 creates a plurality of rows of nozzles 163 operable to disperse the liquid mixture as a fine mist having micro-sized droplets into vaporization zone 160. After a number of passes, any amount of the liquid mixture that is not introduced into vaporization zone 160 is eventually directed by conduit 143 out of housing 120 through liquid mixture outlet 144.

Vacuum chamber 180 further comprises a jacketed fluid collection trough 170 comprising a channel 174 and an at least partially hollow wall structure 175. A temperature control fluid enters vacuum chamber 180 via inlet 176 and is directed into the hollow wall structure 175 by jacket conduit 177. In certain embodiments, hollow wall structure comprises a plurality of longitudinally extending chambers 181 through which a temperature control fluid is supplied or removed via an orifice 183. The temperature control fluid may be any fluid known to those of skill in the art, such as water or a portion of the purified product of apparatus 110. In the embodiment illustrated, the temperature control fluid is routed through each chamber 181 in a serpentine-like manner; however, it is within the scope of the present invention for each chamber 181 to be independently supplied with temperature control fluid via a distribution header. After a number of passes, the temperature control fluid is directed out of housing 120 through outlet 179 in end cap 132. The temperature control fluid ensures a constant and uniform temperature within vaporization zone 160 so as to minimize the cooling effect that the evaporation of liquid from the droplets dispersed by nozzles 163 has on overall vaporization efficiency. Fluid-collection trough 170 comprises one or more trough supports 172 attached to the outer wall of the fluid-collection trough 170 and disposed to maintain a the spatial relationship between the trough 170 and outer housing 120.

Vacuum chamber 180 further comprises vapor passage 164 through which vapor generated in vaporization 160 passes en route to condensing structure 149. A temperature control fluid, of the same or different type than the temperature control fluid being passed through jacketed trough 170, is directed into housing 120 via line 166. A vapor passage conduit 167 conducts the temperature control fluid along the length of housing 120 within vapor passage 164 toward end cap 133 in a serpentine-like manner). After a number of passes, conduit 167 directs temperature control fluid out of housing 120 through outlet 169. Conduit 167 and the temperature control fluid circulated therethrough serve to control the temperature within vapor passage 164. This structure ensures that the product desired for recovery remains in the vapor phase during its traverse of passage 164 and also provides for condensation of any undesired material inadvertently vaporized and sought to be collected in channel 174. A mesh material 165 is disposed above trough 170 and supply conduit 163 in vapor passage 164, best illustrated in FIG. 15. The mesh material 165 may be wound around conduit 167 not only to prevent liquid droplets from escaping through vapor passage 164, but also to provide further contact surface for condensation of undesired materials. In certain embodiments, the temperature control fluid flowing through conduit 167 is of the same or nearly the same temperature as the fluid flowing through jacketed trough 170. However, this need not always be the case.

Condensing structure 149 further comprises a condenser fluid supply conduit 154 directed along the length of housing 120 and disposed above fluid collection trough 170. In certain embodiments, condenser fluid supply conduit 154 may be covered with bonnet structures 157, 158, and 159, which are preferably fabricated of a non-corrosive sheet metal material. Condenser fluid supply conduit 154 is fed with condensing fluid via inlet 150. Conduit 154 then generally traverses within vacuum chamber 180 in a serpentine manner, immediately above trough 170 for a plurality of passes. The condensing fluid flowing through conduit 154 is generally of a sufficient temperature to condense the vapor component that has passed through passage 164. Bonnet structures 157-159 serve to direct the flow of vapor within vacuum chamber 180 outside of vaporization zone 160. At least a portion of the vapor from passage 164 is directed in between bonnets 157, 159 and then deflected by bonnet 158 over conduit 154. The fluid condensed by bonnet 158 and conduit 154 is directed over the outboard surfaces of bonnets 157, 159 toward fluid collection zone 182. Another portion of the vapor from passage 164 contacts the inboard surfaces of bonnets 157, 159 whereby a portion of the vapor is condensed as liquid product as a result of the refrigeration provided by the condensing fluid within conduit 154. The condensed fluid tends to cling to the inboard surfaces of bonnets 157, 159 and too is directed toward fluid collection zone 182. The condensing fluid exits condensing structure 149 via outlet 156.

The non-vaporized portion of the liquid mixture introduced into vaporization zone 160 is collected in a channel 174 of fluid collection trough 170 and directed out of the apparatus 110 through liquid discharge outlet 146. The recovered liquid product is discharged from apparatus 110 through outlet 148.

Turning to FIG. 16, a system for recovering a liquid product from a liquid mixture made in accordance with one embodiment of the present invention is shown. A stream 201 of a raw liquid mixture is provided delivered from a liquid source, such as a well, stream, pond, or lake, via a pump assembly 200. Assembly 200 may include a trash filtration system to remove large solid particulates drawn into the system by the pump. As the exact composition of the raw liquid mixture is likely to be unknown absent analytical testing, in certain embodiments, liquid mixture feed stream 201 is assumed to comprise a most volatile fraction, a less volatile fraction, and a least volatile fraction. The most volatile fraction may comprise volatile organic compounds or other volatile components. A check valve 202 is provided to ensure unidirectional flow of stream 201 and prevent backflow of the raw liquid mixture into pump assembly 200. Feed stream 201 is then directed through a primary filtration system 203 where additional solid particulates entrained within the raw liquid mixture are removed. The stream is then warmed in a heat exchanger 205 and delivered to a warmed feed holding tank 210.

Warmed liquid mixture stream 212 is pumped out of warmed feed holding tank 210 by pump 211 and directed through an exhaust gas heat exchanger 215. Heat exchanger 215 is supplied with heat by the exhaust gas from a generator 300. Generator 300 may be diesel fueled or any other type of heat-generating system. From heat exchanger 215, stream 212 is fed into primary heated liquid holding tank 220. In certain embodiments, such as those where the heated liquid comprises water at the majority component, the temperature of the heated liquid within holding tank 220 may be between about 90° F. to about 130°, or between about 100° F. to about 120 F. Heated liquid mixture stream 221 is pumped out of holding tank 220 by pump 226 and directed through a gas-handling apparatus 225 operable to dissolve a gas component into heated liquid mixture stream 221 to form gas-containing mixture stream 227. In certain embodiments, gas-handling apparatus 225 comprises a gas diffuser operable to dissolve a gas, such as air, carbon dioxide, nitrogen, oxygen, or any combination thereof, into the liquid mixture. Any non-dissolved gasses introduced into stream 221 can be removed via a gas release valve located at the top of the diffuser. The dissolved gas-containing mixture stream 227 should be at a temperature and composition such that the most volatile fraction will vaporize when exposed to vacuum pressure conditions.

Dissolved gas-containing mixture stream 227 is fed into a separation vessel 230. In certain embodiments, separation vessel 230 is constructed similarly to a separation apparatus as shown in FIGS. 1-15. However, the function of separation vessel 230 is to separate the most volatile fraction from the liquid mixture thereby leaving the desired liquid product as the next most volatile component remaining. As recovery of the most volatile component is not a primary objective, separation vessel 230 need not be provided with condenser structure. But, in all other respects, separation vessel 230 may be constructed as described above. As noted above, the separation vessels described herein comprising a tubular outer housing defining a vacuum chamber, a fluid-collection trough, and a supply conduit comprising one or more spray nozzles. In certain embodiments, separation vessel 230 is operable to separate the most volatile fraction of dissolved gas-containing mixture stream 227. The most volatile fraction is vaporized within vessel 230 and discharged through a vacuum port (not shown) operably connected with a vacuum pump. Any portion of dissolved gas-containing mixture stream 227 not introduced into the vacuum chamber of vessel 230 is directed by recycle stream 228 back into warmed feed holding tank 210. A check valve 229 can be employed to prevent backflow into separation vessel 230.

The non-vaporized portion of stream 227 is collected within vessel 230 and subsequently removed therefrom as bottoms stream 231. Primary bottoms stream 231 comprises the less volatile fraction and least volatile fraction, with the most volatile fraction having been substantially removed by vessel 230. Bottoms stream 231 is fed to one holding tank assembly 232, comprising one or more holding tanks. The liquid mixture from holding tank assembly 232 is directed via pump 233 as a stream 236 through heat exchanger 235 and gas exhaust heat exchanger 215 where it is warmed. Heat for heat exchanger 235 may be supplied by a heat pump 270. The heated stream 236 is then fed into exhaust gas heat exchanger 215 before going to a heated liquid holding tank 240. From holding tank 240, stream 242 is pumped again through heat exchanger 215 and into another heated liquid holding tank 250 by pump 241. In certain embodiments, such as where the heated liquid comprises water as a majority component, the heated liquid within tank 250 has a temperature of between about 160° F. to about 200° F., or between about 170° F. to about 190° F., or about 180° F. The heated liquid mixture from tank 250 is directed as stream 251 through gas handling apparatus 255 by pump 256. Gas handling apparatus 255 is operable to dissolve a gas component (e.g., air, carbon dioxide, nitrogen, oxygen or the like) into heated liquid mixture stream 251 to form a dissolved gas-containing mixture stream 257. Like gas-handling apparatus 225, in certain embodiments, gas-handling apparatus 255 may be a diffuser operable to introduce and dissolve a gas into the liquid mixture. Dissolved gas-containing mixture stream 257 should now be at a temperature such that the less volatile fraction of the liquid mixture will vaporize when exposed to vacuum pressure conditions, while the least volatile fraction remains liquid.

Dissolved gas-containing liquid mixture stream 257 is fed into another separation vessel 260. In certain embodiments, separation vessel 260 is configured as any of the separation vessels described herein comprising a tubular outer housing defining a vacuum chamber, a fluid-collection trough, and a supply conduit comprising one or more spray nozzles. Unlike separation vessel 230, because the vaporized component is to be recovered, separation vessel 260 further comprises condensing structure operable to condense at least a portion of the vapor produced within vessel 260. In certain embodiments, separation vessel 260 is operable to separate the less volatile fraction from the least volatile fraction of dissolved gas-containing mixture stream 257. The less volatile fraction is vaporized and then condensed within vessel 260 to form a liquid product that is withdrawn from vessel 260 as product stream 273. Product stream 273 is substantially a pure liquid comprising the less volatile component, which in certain embodiments means that the liquid is greater than 99.5% pure. The non-vaporized least volatile fraction, which may contain dissolved solids, exits vessel 260 as liquid discharge stream 263. Liquid discharge stream 263 is directed into one or more discharge holding tank assembly 265 and eventually out of the system by pump 266. Any portion of dissolved gas-containing mixture stream 257 not introduced into the vacuum chamber of vessel 260 is directed back into heated liquid holding tank 240 via stream 261. Again, a check valve 262 may be employed to ensure unidirectional flow. Liquid product stream 273 is directed into a holding tank assembly 275 and eventually pumped into product holding tank 280 via stream 274 by pump 276. Liquid product is pumped out of holding tank 280 by pump 281 and exits the system. In certain embodiments of the present invention, the liquid product comprises water that is between 99.5% and 100% pure.

Optionally, one or more flow control valves may be installed within the system to alter the flow path of at least a portion of certain streams. Valve 290 may be installed to direct a portion of liquid product stream 274 into condenser recycle stream 277. Recycle stream 277 is cooled by heat exchanger 205 and heat pump 270 to form cooled condenser stream 272. Condenser stream 272 is pumped by pump 271 into separation vessel 260 to supply at least a portion of the condensing fluid (and preferably, substantially all of the condensing fluid) operable to condense the vapor product within separator 260. Valve 297 may be installed and operated to permit at least a portion of cooled condenser stream 272 to bypass separator 260 and feed into liquid product stream 274 for startup and testing.

Other flow control valves may be installed for temperature control. Valve 291 may be installed to permit stream 212 to bypass heat exchanger 215 in situations where no further heating is necessary. In contrast, valve 292 may be installed to permit stream 212 to recycle back into warmed feed holding tank 210 when more heating is necessary. Similarly, valve 293 may be installed to direct at least a portion of stream 227 into holding tank 210 when further heating is necessary to effect vaporization of the most volatile fraction in separation vessel 230. Valves 294, 295, and 296 operate in the same manner as valves 291, 292, and 293, respectively except they control the temperature of the streams leading to separation vessel 260 and are used primarily in startup operations.

It is recognized that various pieces of equipment may be redundantly installed to allow for servicing of the equipment while keeping the overall system operational. For example, multiple pumps could be installed in parallel. The plurality of pumps may all be utilized during start up of the system, and once a steady state is achieved, one or more pumps could be switched off to reduce operating costs and allow for equipment servicing. Further, additional heat pumps may be utilized to supply the necessary heating and refrigeration. Electric heaters may also be used in place of or to supplement the energy from heat pump 270.

We claim:

1. An apparatus for recovering a liquid product from a liquid mixture, said apparatus comprising:
    an outer housing defining a vacuum chamber located within said housing;
    a material-collection trough located within said housing and defining at least in part a vaporization zone of said vacuum chamber and a channel into which non-vaporized material originally contained in said liquid mixture is collected, said trough further defining a vapor passage for a vapor product exiting said vaporization zone;
    one or more liquid mixture supply conduits located within said vaporization zone and extending along at least a portion of the length thereof, each of said conduits comprising one or more nozzles operable to introduce the liquid mixture into said vaporization zone as a plurality of finely dispersed droplets, at least a portion of the liquid mixture contained within said droplets being vaporized within said vaporization zone to form the vapor product, said channel being configured to collect any portion of the liquid mixture not vaporized in said vaporization zone;
    a gas-handling apparatus operable to dissolve a gas component into the liquid mixture, said gas component becoming liberated from the liquid mixture as the liquid mixture is vaporized within said vaporization zone; and
    a condensing structure located within said housing in disposition to contact and condense at least a portion of the vapor product exiting said vaporization zone through said vapor passage thereby forming the liquid product.

2. The apparatus according to claim 1, said housing having a substantially horizontal longitudinal central axis.

3. The apparatus according to claim 2, said trough having a longitudinal central axis substantially parallel to the longitudinal central axis of said housing.

4. The apparatus according to claim 1, said condensing structure including a condensing fluid supply for delivering a laminar flow of a condensing fluid to an inner wall surface of said housing, the flow of condensing fluid causing at least a portion of the vapor product to condense.

5. The apparatus according to claim 1, said condensing structure comprising one or more coolant tubes through which is flowed a coolant having a temperature sufficient to condense at least a portion of the vapor product.

6. The apparatus according to claim 1, said condensing structure including one or more liquid product collectors operable to collect condensed liquid product and/or direct the liquid product toward a liquid product outlet.

7. The apparatus according to claim 1, said trough comprising an at least partially hollow wall structure through which a warming fluid may be flowed so as to maintain a substantially constant temperature within said vaporization zone.

8. The apparatus according to claim 1, said apparatus further comprising mesh material at least partially disposed within said vapor passage operable to prevent liquid droplets from escaping said vaporization zone through said vapor passage.

9. The apparatus according to claim 8, said apparatus further comprising one or more temperature control fluid conduits located within said vapor passage and adjacent to said mesh material and through which a temperature control fluid may be flowed so as to control the temperature within said vapor passage.

10. A system for recovering a liquid product from a liquid mixture comprising a most volatile fraction, a less volatile fraction, and a least volatile fraction, the less volatile fraction comprising the predominant component of the liquid mixture, said system comprising:
    a first gas-handling apparatus operable to introduce a first gas component into the liquid mixture so as to cause at least a portion of the first gas component to become dissolved within the liquid mixture;
    a first separation apparatus located downstream from said first gas-handling apparatus and operable to separate the most volatile fraction from the less volatile fraction and least volatile fraction, said first separation apparatus comprising:
        a first outer housing defining a first vacuum chamber located within said first housing,
        a first fluid-collection trough located within said first vacuum chamber and defining at least in part a first vaporization zone of said vacuum chamber and a first channel into which liquid may be collected, said first trough further defining a first vapor passage for a most volatile fraction vapor product exiting said first vaporization zone, and
        one or more nozzles located within said first vaporization zone and operable to introduce the liquid mixture into said vaporization zone as a plurality of finely dispersed droplets, at least a portion of the liquid mixture contained within said droplets being vaporized within said first vaporization zone to form the most volatile component vapor product, said first channel being configured to collect any portion of the liquid mixture not vaporized in said first vaporization zone and deliver the non-vaporized portion from said first trough and said first housing as an enriched liquid mixture;

a second gas-handling apparatus located downstream from said first separation apparatus and operable to introduce a second gas component into the enriched liquid mixture from said first separation apparatus so as to cause at least a portion of said second gas component to become dissolved within the enriched liquid mixture; and a second separation apparatus located downstream from said second gas-handling apparatus and operable to separate a portion of the less volatile fraction the least volatile fraction, said second separation apparatus comprising:
- a second outer housing defining a second vacuum chamber located within said second housing,
- a second fluid-collection trough located within said second vacuum chamber and defining at least in part a second vaporization zone of said second vacuum chamber and a second channel into which liquid may be collected, said second trough further defining a second vapor passage for a less volatile fraction vapor product exiting said second vaporization zone,
- one or more nozzles located within said second vaporization zone and operable to introduce the enriched liquid mixture into said second vaporization zone as a plurality of finely dispersed droplets, at least a portion of the enriched liquid mixture contained within said droplets being vaporized within said second vaporization zone to form the less volatile fraction vapor product, said second channel being configured to collect any portion of the enriched liquid mixture not vaporized in said second vaporization zone, and
- a condensing structure located within said second housing in disposition to contact and condense at least a portion of the less volatile fraction vapor product exiting said second vaporization zone through said second vapor passage thereby forming said liquid product.

11. The system according to claim 10, said condensing structure further comprising a recycle stream comprising a portion of said liquid product, said recycle stream being delivered to an inner wall surface of said second outer housing as a laminar condensing fluid stream.

12. The system according to claim 10, said first and second housings having respective, substantially horizontal longitudinal central axes.

13. The system according to claim 12, said first and second troughs having respective longitudinal central axes that are substantially parallel to the longitudinal central axis of said first and second housings, respectively.

* * * * *

UNITED STATES PATENT AND TRADEMARK OFFICE
CERTIFICATE OF CORRECTION

PATENT NO. : 9,527,006 B2  
APPLICATION NO. : 13/970391  
DATED : December 27, 2016  
INVENTOR(S) : Sam J. Burton et al.

Page 1 of 1

It is certified that error appears in the above-identified patent and that said Letters Patent is hereby corrected as shown below:

On the Title Page

Please correct item (73) as follows:
Delete "Kingsville, MI" and insert --Kingsville, MO--.

Signed and Sealed this
Eleventh Day of April, 2017

Michelle K. Lee
*Director of the United States Patent and Trademark Office*